(12) United States Patent
Terwilliger et al.

(10) Patent No.: US 10,145,700 B2
(45) Date of Patent: Dec. 4, 2018

(54) VEHICLE FIRMWARE UPDATE USING A VEHICLE GATEWAY

(71) Applicant: Dell Products L.P., Round Rock, TX (US)

(72) Inventors: Kevin Terwilliger, Austin, TX (US); Andrew Tosh, Cedar Park, TX (US); Jefferson Walter Wirtz, Round Rock, TX (US); Rex Bryan, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/286,526

(22) Filed: Oct. 5, 2016

(65) Prior Publication Data
US 2018/0093623 A1      Apr. 5, 2018

(51) Int. Cl.
| | |
|---|---|
| G01C 21/34 | (2006.01) |
| G08G 1/052 | (2006.01) |
| H04L 29/08 | (2006.01) |
| G01C 21/36 | (2006.01) |
| B60R 16/023 | (2006.01) |

(52) U.S. Cl.
CPC ...... *G01C 21/3469* (2013.01); *B60R 16/0236* (2013.01); *G01C 21/3679* (2013.01); *G08G 1/052* (2013.01); *H04L 67/12* (2013.01); *H04L 67/34* (2013.01)

(58) Field of Classification Search
CPC ............... G08G 1/052; G01C 21/3469; G01C 21/3679; B60R 16/0236; H04L 67/12; H04L 67/14

USPC .......................................................... 701/102
See application file for complete search history.

(56) References Cited

U.S. PATENT DOCUMENTS

| | | | |
|---|---|---|---|
| 6,154,658 A | 11/2000 | Caci | |
| 6,996,469 B2 | 2/2006 | Lau et al. | |
| 8,075,484 B2 | 12/2011 | Moore-Ede | |
| 8,935,119 B2 | 1/2015 | Yuen | |
| 8,972,175 B2 | 3/2015 | Annapureddy et al. | |
| 9,026,343 B2 | 5/2015 | Mays | |
| 2009/0322510 A1* | 12/2009 | Berger | G06Q 10/08 340/539.1 |
| 2014/0240132 A1 | 8/2014 | Bychkov | |

(Continued)

FOREIGN PATENT DOCUMENTS

| | | | |
|---|---|---|---|
| ES | 2358834 A1 * | 5/2011 | |
| WO | WO-2015134372 A1 | 9/2015 | |

*Primary Examiner* — Mahmoud Gimie
(74) *Attorney, Agent, or Firm* — Norton Rose Fulbright US LLP (57) ABSTRACT

Electronic components may be integrated in objects used by the trucking industry, such as truck, tractor trailer, cargo, and loading bay. These objects may then communicate with each other and with a gateway device to transmit or receive data or commands. The gateway may be configured to attach to the truck, such as by securing to the truck frame or securing to an interior of the truck cab. The gateway may couple to one or more input devices, and receive sensor data through the one or more input devices. The gateway may execute steps that allow the gateway to update an engine computer with a firmware that provides better operation, such as improved fuel efficiency, during a portion of the vehicle's route.

20 Claims, 9 Drawing Sheets

(56) References Cited

U.S. PATENT DOCUMENTS

2015/0258961 A1\* 9/2015 Doherty ................ B60R 25/042
 701/2
2015/0325062 A1 11/2015 Mason et al.
2017/0192770 A1\* 7/2017 Ujiie ........................ B60R 16/02

\* cited by examiner

VEHICLE FIRMWARE UPDATE USING A VEHICLE GATEWAY

CROSS-REFERENCE TO RELATED PATENT APPLICATIONS

This application is related by subject matter to U.S. patent application Ser. No. 15/286,435 filed on Oct. 5, 2016 entitled, "Trailer Identification, Inspection, and Verification Using a Vehicle Gateway," to U.S. patent application Ser.No. 15/286,476 filed on Oct. 5, 2016 and entitled, "Cargo Geofencing using a Vehicle Gateway," to U.S. patent application Ser. No. 15/286,499 filed on Oct. 5, 2016 and entitled, "Trailer Loading using a Vehicle Gateway," to U.S. patent application Ser.No. 15/286,520 filed on Oct. 5, 2016 and entitled, "Truck Safety Zone using a Vehicle Gateway," and to U.S. patent application Ser. No. 15/286,534 filed on Oct. 5, 2016 and entitled, "Determining a Driver Condition using a Vehicle Gateway."

FIELD OF THE DISCLOSURE

The instant disclosure relates to electronic devices. More specifically, portions of this disclosure relate to integration of electronic devices in the operation of vehicles.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems have garnered ubiquitous use in certain fields, such as financial transactions, data storage, and the like. This is due, in part, to the ability of information handling systems to handle large numbers of tasks with significantly fewer errors than other techniques. Information handling systems can be designed or programmed specifically to perform certain functions, and thus take advantage of further speed advantages from this customization. However, there are certain industries and fields that have historically not modernized to take advantage of the capabilities of information handling systems, or to not fully take advantage of such systems by having specially-designed components. One such industry is the trucking industry. Tractor trailers are responsible for a significant amount of merchandise movement throughout the country and continent, and typically also a part of every merchandise's journey. The population is continuously growing, and also the demand for merchandise. Thus, the trucking industry is also continuously growing. The number of tractor trailers on the road and the number of deliveries by each tractor trailer are continuing to increase. Yet, there has been little modernization of the trucking industry.

However, lack of modernization and implementation of information handling systems has caused many problems with operation of a fleet of tractor trailers. As one example, there is little to no monitoring of truck driver health, such as enforcement of sleep requirements or monitoring of other health issues, which can result in unsafe driving and collisions involving tractor trailers. As another example, fuel efficiency is critical to profit margins of the tractor trailers, and yet there is little or no monitoring of engine operating conditions. As yet another example, the distribution of freight within a tractor trailer can impact operational efficiency and driving stability, and yet there is no optimization of freight arrangements within the tractor trailer. As a further example, the only monitoring of tractor trailers is through GPS devices with limited functionality. Thus drivers often pick up the wrong trailer in a shipping yard, which leads to lost or misdirected merchandise and lost profit.

SUMMARY

Electronic components may be integrated in objects used by the trucking industry, such as truck, trailer, cargo, and loading bay. These objects may then communicate with each other and/or with a gateway device to transmit or receive data or commands. The communications between devices may include relay of information from the objects to a remote server through the Internet. Either the gateway device or the remote server may use the relayed information to verify certain information or provide instruction to vehicle operators to improve efficiency and accuracy of the trucking industry. For example, by verifying trailers assigned to trucks have been picked up by the correct trucks, a reduction in misdirected or lost merchandise is obtained. As another example, by ensuring inspection checklists are completed, costly malfunctions may be avoided and profit margins increased. As a further example, by monitoring the health of the user, the user may feel more secure and happy with their job and thus drivers may be retained longer.

A vehicle gateway, or just "gateway," may be configured to attach to the truck, such as by securing to the truck frame or securing to an interior of the truck cab. The gateway may receive power from the vehicle power system and/or an independent power supply, such as a battery or solar cell. Although vehicle gateways are described as part of a vehicle, the gateways may be used in areas outside of the vehicle such as in loading bays, parking areas, or the like. The gateway may couple to one or more input devices to receive sensor data. The gateway may also be configured, for some of the input devices, to transmit commands to alter operation of certain components onboard or off-board the vehicle. For example, one input device may be a communications radio, such as a Wi-Fi radio, Bluetooth radio, cellular communication radio, or other short-range or long-range communication radio. Through the communications radio the gateway may receive sensor data, for example, from sensors located throughout the trailer or nearby the trailer (e.g., in range of the communications radio). For example, the sensors may be attached to the trailer. In another example, the sensors may be in nearby containers and/or in nearby vehicles. As another example, an input device may be an interface for connecting to an engine computer, such as an OBDII port. The gateway may process raw data received from the electronic components, store the raw or processed data, and/or relay the raw or processed data to a remote server.

The integration of electronic components in the trucking industry makes available new applications for these electronic components and improves operations and efficiency in the trucking industry. For example, beacon devices, or just "beacons," may be integrated with trailers and a vehicle gateway may activate the beacon to determine the trailer identification and verify the correct trailer is being picked up by the vehicle. The beacons may include a memory circuit with stored information and a communications circuit for communicating the stored information to a gateway. As another example, the vehicle gateway may communicate with biometric systems, including mobile devices such as smart watches and mobile phones, to collect information regarding driver behaviors, such as sleep patterns, to assess a condition of the driver. As a further example, electronic sensors may be integrated throughout a tractor trailer and communicate with the vehicle gateway to monitor and/or optimize loading of cargo into the tractor trailer. As yet another example, beacons may be attached to cargo containers and the beacons linked with contents of the cargo such that a vehicle gateway may determine conflicts that may exist between different cargo contents that may create a hazardous condition. As another example, vehicle gateways may communicate with other vehicle gateways to determine and/or optimize formation of vehicle platoons and provide information that ensures safety of nearby vehicles. As a further example, a vehicle gateway may monitor driving conditions and/or a planned truck route to determine when a different engine firmware may provide better fuel efficiency or other benefits and then update the engine firmware with an appropriate firmware.

The vehicle gateway may operate as a data collection device and/or a data processing device. As described throughout, the gateway may receive data from input devices that communicate with beacons, sensors, mobile devices, or other components. This data may be forwarded through, for example, cellular communications systems to cloud-based server that process the data. A driver or other user may then access a dashboard presenting the information and/or alerts based on the information through a web-based interface. Further, the driver or other user may issue commands to the vehicle gateway that are relayed to components in communications with the gateway. The commands may include, for example, remotely updating an engine firmware, changing a vehicle route, establishing new stops on the route, providing messages to a driver, or placing operating restrictions on the vehicle. Cloud-based servers may also automate certain functions by performing monitoring of the received data and sending commands to the gateway when certain conditions are satisfied. Although the gateway may communicate with cloud-based server, the gateway may also independently perform some or all of these functions. For example, a driver or user may access the gateway through a mobile device or nearby computer to access data stored on the gateway. Further, the gateway may process the data and analyze the data to determine if certain conditions are satisfied and take action, such as by transmitting alerts to the driver or another user According to one embodiment, an information handling system may include at least one input device configured to provide information regarding a vehicle, and a vehicle gateway configured to communicate with the at least one input device and to communicate with an engine computer of the vehicle through the input device, such as a OBDII port. The vehicle gateway may be configured to perform input/output (I/O) operations through the input port, such as perform operations to update the firmware of the engine computer by performing read and write operations. The firmware may be updated by writing an entire new firmware or updated by modifying an existing firmware. The updated firmware may be selected based on a known location of the vehicle and/or known conditions at that known location. For example, the vehicle gateway may perform steps including receiving information from the at least one input device indicating a current location of the vehicle and programming the engine computer with a firmware based, at least in part, on the current location of the vehicle. Other input devices may also be coupled to the vehicle gateway to perform additional functionality, such as a wide area network (WAN) connection to obtain information from a remote server.

In certain embodiments, the information handling system may be used to determine when operating conditions at a location along a route would cause reduced engine performance and take steps to improve engine performance. For example, some altitudes of roads may cause reduced engine performance when the engine is operating under a first firmware. The vehicle gateway may determine conditions for roads along a planned route and determine that a second firmware may provide better engine performance. The vehicle gateway may determine a location along the route to update the engine computer firmware to improve engine performance. The vehicle gateway may use known planned stops along the route to determine when to update the engine firmware or may alter the planned route to include a stop for updating the engine firmware.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems may be adapted to provide services to vehicles, to fleets of vehicles, and/or to drivers of vehicles. Such information handling systems may be particularly useful in the trucking industry, where historically little modernization has occurred. Some hardware and software components for such information handling systems are described in further detail below. One such hardware component is a vehicle gateway that is configured to attached to a vehicle, such as a tractor pulling a trailer. The vehicle gateway may communicate with electronic components in and around the vehicle through wired and wireless communications paths. The gateway may also execute software components for processing the data, triggering alerts, making recommendations, and/or adjusting operation of the vehicle.

Figure 1:
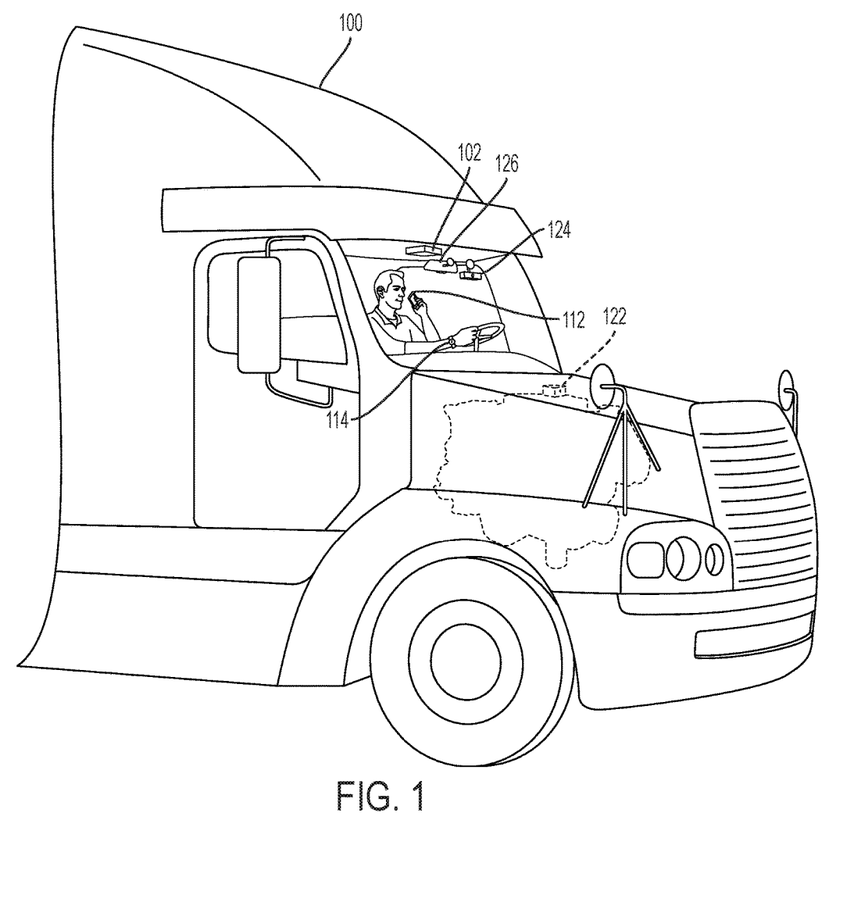
FIG. 1 is a perspective view of a vehicle illustrating an installed gateway for communicating with electronic components in or around the vehicle according to one embodiment of the disclosure.

FIG. 1 is a perspective view of a vehicle illustrating an installed gateway for communicating with electronic components in or around the vehicle according to one embodiment of the disclosure. A vehicle 100 may be a truck with tractor trailer, as shown, or another kind of vehicle, such as a car or sport-utility vehicle (SUV), or another transportation device, such as a cargo boat or aircraft. A gateway 102 may be configured to attach to and attached to the vehicle 100, such as by a screw, bolt, Velcro, adhesive, or other fixing means that affixes the gateway 102 to a component of the vehicle 100, such as a frame or an interior of a cab of the vehicle 100. In some embodiments, the gateway 102 may be a separate component inside the vehicle 100. In some embodiments, the gateway 102 may be integrated with another component attached to the vehicle 100, such as an in-dash display or radio. The gateway 102 may be connected to power or communications systems of the vehicle 100. For example, the gateway 102 may be powered from a 12 Volt direct-current (DC) bus operated by a battery in the vehicle 100. Additionally or alternatively, the gateway 102 may include a back-up or other separated power system to operate the gateway 102 when the vehicle 100 is turned off or when the vehicle 100 malfunctions.

The gateway 102 may communicate with electronic components in and around the vehicle 100 through input devices coupled to the gateway 102. For example, a driver may have a mobile phone 112, a smart watch 114, and/or other electronic devices, such as a tablet computer, a laptop computer, a television, a radio, a GPS device, etc. These mobile devices 112 and 114 may communicate with the gateway 102 through an input device such as, for example, a Bluetooth radio, a Wi-Fi radio, a near field communications (NFC) radio, or other short-range communications radio. As another example, an engine of the vehicle 100 may have an engine computer 122. The gateway 102 may include an input device configured to communicate with the engine computer 122, such as an ODBII port. The gateway 102 may be further coupled to other electronic devices, such as a road-facing camera 124 and/or an eye-tracking system 126, by either wireless or wired connections similar to that described in the examples above. The eye-tracking system 126 may be used to monitor eye movement of a driver, which can provide information regarding, for example, the driver's alertness.

Figure 2:
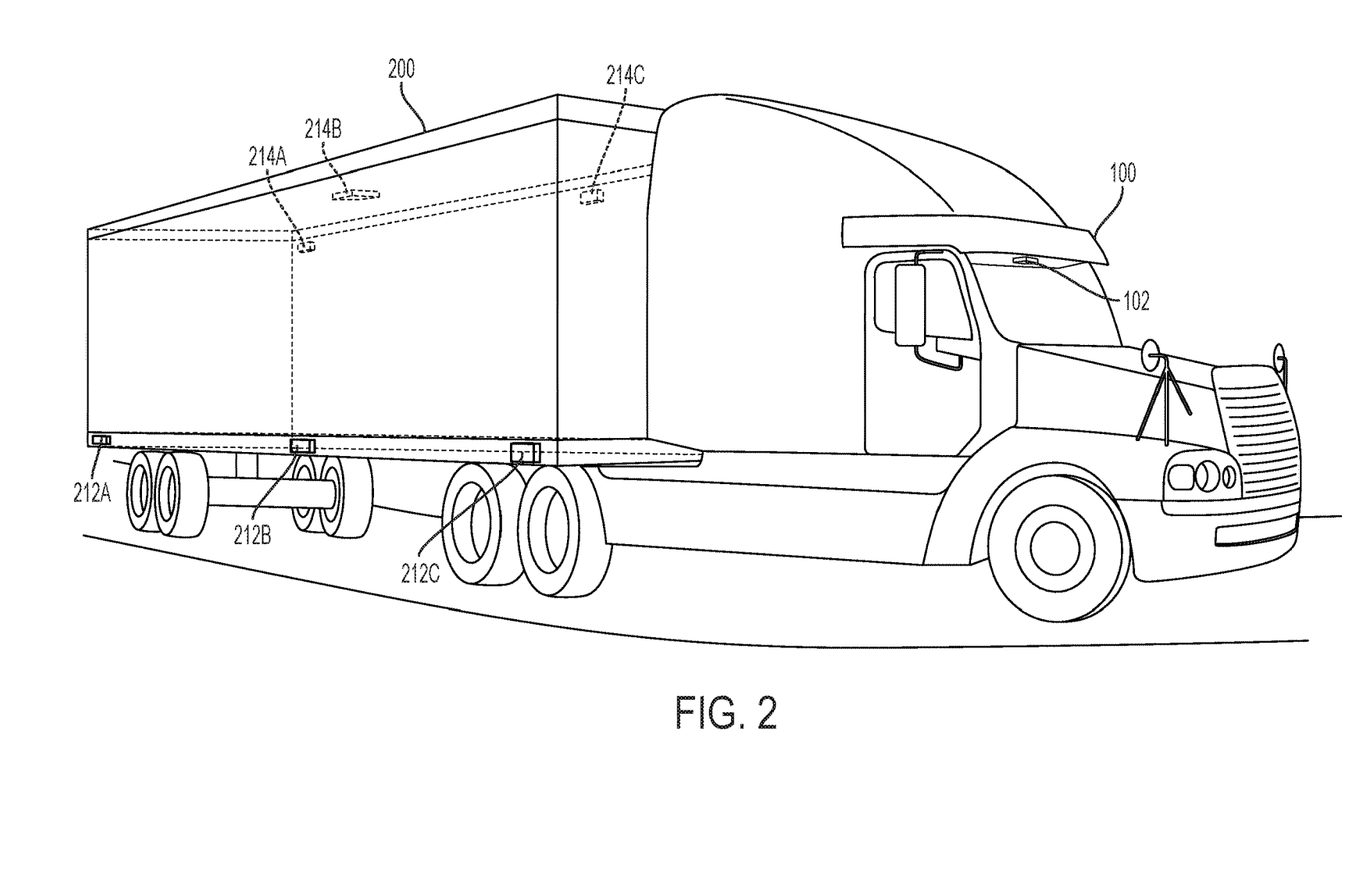
FIG. 2 is a perspective view of a vehicle illustrating an installed gateway for communicating with sensors in and around a tractor trailer attached to the vehicle according to one embodiment of the disclosure.
Figure 3:
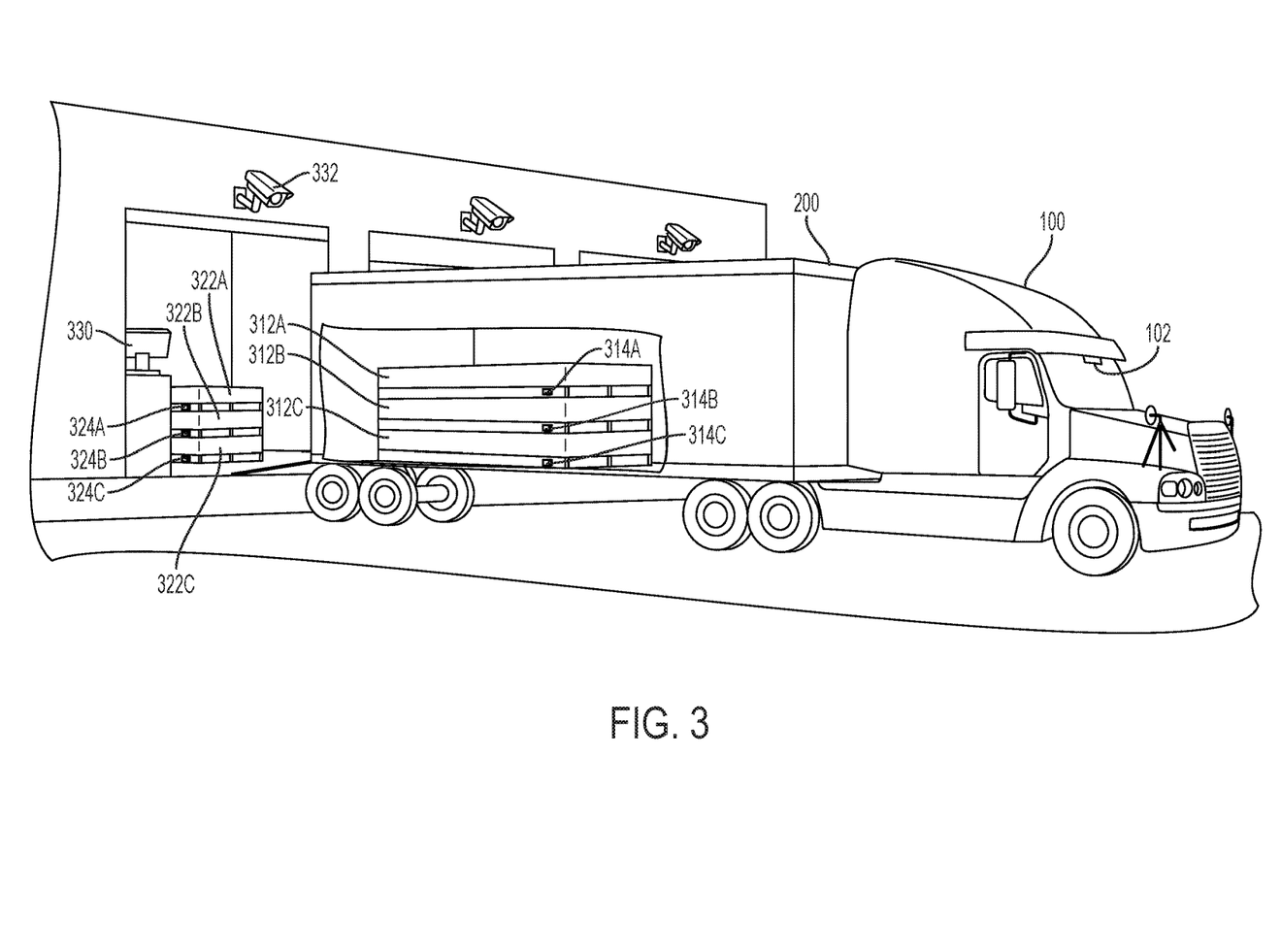
FIG. 3 is a perspective view of a vehicle illustrating an installed gateway for communicating with electronic components in and around the vehicle and in and around a loading bay according to one embodiment of the disclosure.
Figure 4:
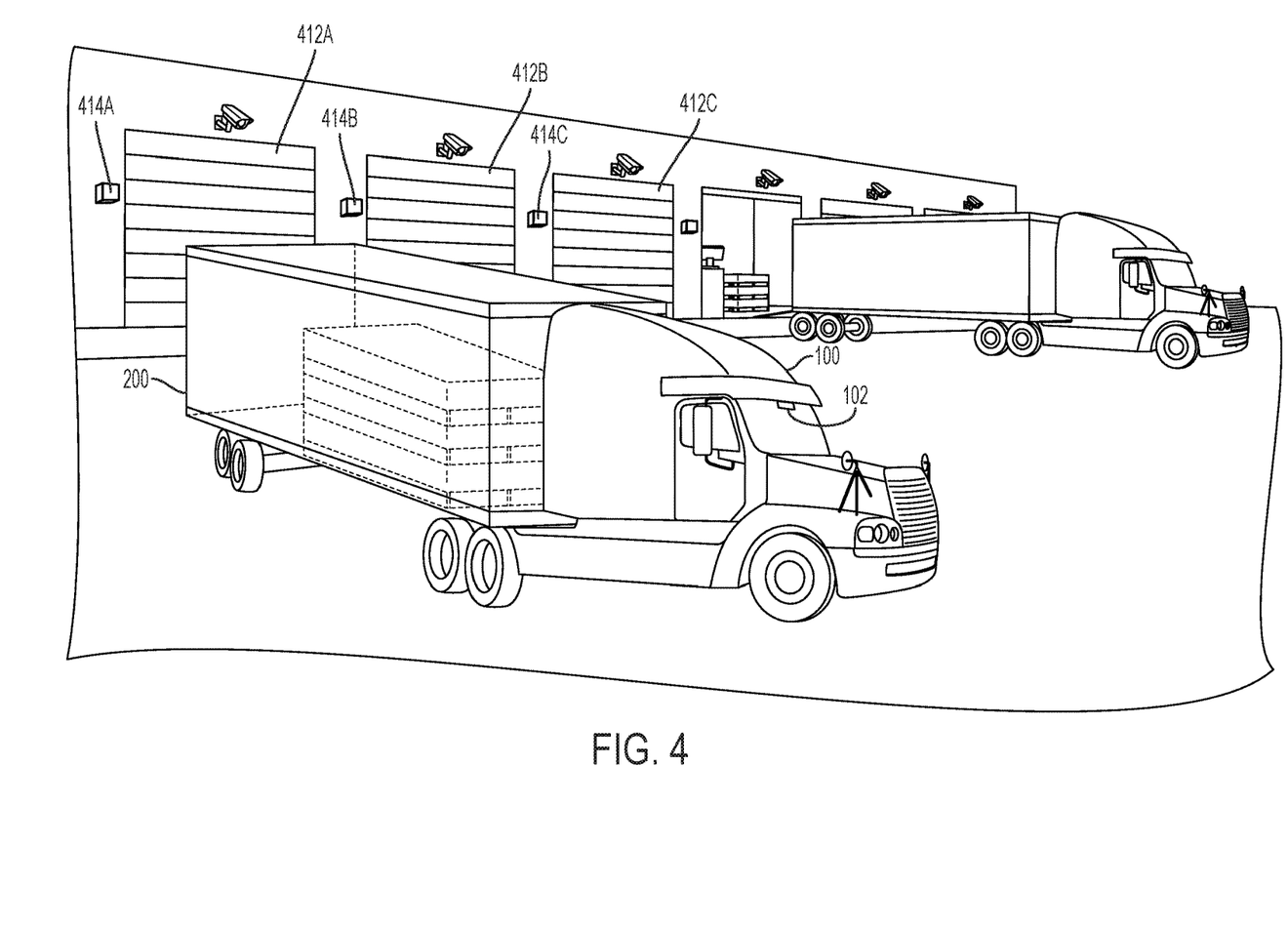
FIG. 4 is a perspective view of a vehicle illustrating an installed gateway for communicating with electronic components in cargo and around a loading bay or other nearby vehicles according to one embodiment of the disclosure.

FIG. 1 shows one configuration of wireless devices that includes user mobile devices 112 and 114, the engine computer 122, the camera 124, and the tracking system 126. However, any combination of electronic devices may be used in combination with the vehicle gateway 102 of embodiments. For example, although FIG. 1 illustrates electronic devices in and around the truck cab, electronic devices may be anywhere in communications range. For example, devices may be in an attached or nearby truck trailer, as shown in FIG. 2, wherein a nearby truck trailer may be a truck trailer within short-range communications range of the vehicle 100. Communications with nearby beacons and gateways may allow, for example, a gateway to identify locations of missing or stolen trailers or cargo when passing within short-range communications range. Further, the vehicle gateway 102 may communicate with stationary gateways and electronic devices, such as beacons, sensors, devices, and gateways in a loading bay as shown in FIG. 3 and FIG. 4. The gateway 102 may also communicate with gateways on other vehicles. For example, a plurality of gateways installed on a plurality of vehicles may communicate with each other to form a mesh network allowing one of the gateways to communicate through other gateways when its long-range communications radio is not functioning correctly.

FIG. 2 is a perspective view of a vehicle illustrating an installed gateway for communicating with sensors in and around a tractor trailer attached to the vehicle according to one embodiment of the disclosure. The gateway 102 may be coupled to or integrated with an input device, such as a low-power RF radio for wireless communications, to communicate with electronic devices 212A, 212B, and 212C attached to a tractor trailer 200. The devices 212A-C may be, for example, sensors (e.g., GPS receivers) or cameras. The devices 212A-C may report loading of the cargo in the trailer or air pressure in tires of the trailer. The same input device may also be used to communicate with electronic devices 214A-C inside the tractor trailer. The devices 214A-C may be beacons attached to cargo that provide information about cargo carried by the tractor trailer or cameras mounted in the interior of the trailer. Example uses of devices attached to the frame and inside the trailer are provided below. The gateway 102 may collect information from the devices 212A-C and 214A-C. The information may be processed by the gateway 102 and used, for example, to assist in arranging cargo in the trailer and in verifying loading of correct cargo in the trailer.

FIG. 3 is a perspective view of a vehicle illustrating an installed gateway for communicating with electronic components in and around the vehicle and in and around a loading bay according to one embodiment of the disclosure. The gateway 102 may communicate with electronic devices outside the vehicle, such as in a loading bay, to facilitate management of cargo in the trailer. For example, cargo pallets 312A, 312B, and 312C inside of the trailer 200 may each have an attached electronic device 314A, 314B, and 314C, respectively, such as a beacon. The beacons 314A-C may transmit cargo identification information that includes an identifier for the attached cargo pallet. The beacon 314A-C may also transmit other information, such as contents of the cargo pallet. In some embodiments, the beacons 314A-C may be active devices that are continuously transmitting data. In other embodiments, the beacons 314A-C may be passive devices that only transmit information when interrogated, similar to RFID tags. Additional cargo pallets 322A, 322B, and 322C may be located inside the loading bay, with attached beacons 324A, 324B, and 324C, respectively. The beacons 324A-C may communicate with the gateway 102 directly. The beacons 324A-C may also communicate with a second gateway 330 inside the loading bay, which may relay information to the gateway 102. Additional electronic devices, inside or outside the trailer 200, may provide further information, such as to verify correct loading of cargo. For example, cameras 332 may capture images or video of the loading of cargo pallets 312A-C and/or 322A-C to provide visual confirmation to verify information from the beacons 322A-C and 324A-C. For example, a gateway 102 may determine if an approximate size of the pallet 312A matches a size of the cargo contents indicated by beacon 322A.

FIG. 4 is a perspective view of a vehicle illustrating an installed gateway for communicating with electronic components in cargo and around a loading bay or other nearby vehicles according to one embodiment of the disclosure. When a vehicle is moving, some electronic devices may enter and exit communications range of the gateway 102. For example, as a tractor trailer drives through a set of loading bays, the gateway 102 may establish communication with each of the electronic devices 414A, 414B, and 414C associated with loading bays 412A, 412B, and 412C, respectively. The gateway 102 may communicate with the electronic devices 414A-C to determine a correct loading bay. The gateway 102 may also communicate with the electronic devices 414A-C to determine if any of the loading bays 412A-C contain cargo that could be potentially hazardous if in close proximity to cargo carried in the trailer. As another example, a vehicle may drive through the loading bays with a gateway 102 to inventory the cargo in the loading bays 412A-C. This would allow for periodic updating of the location of cargo and the ability to find misplaced cargo by driving a vehicle through the loading bay. Alternatively or additionally, the tractor trailers may scan for missing cargo as they drive through the loading bay to pick up or drop-off cargo.

Figure 5:
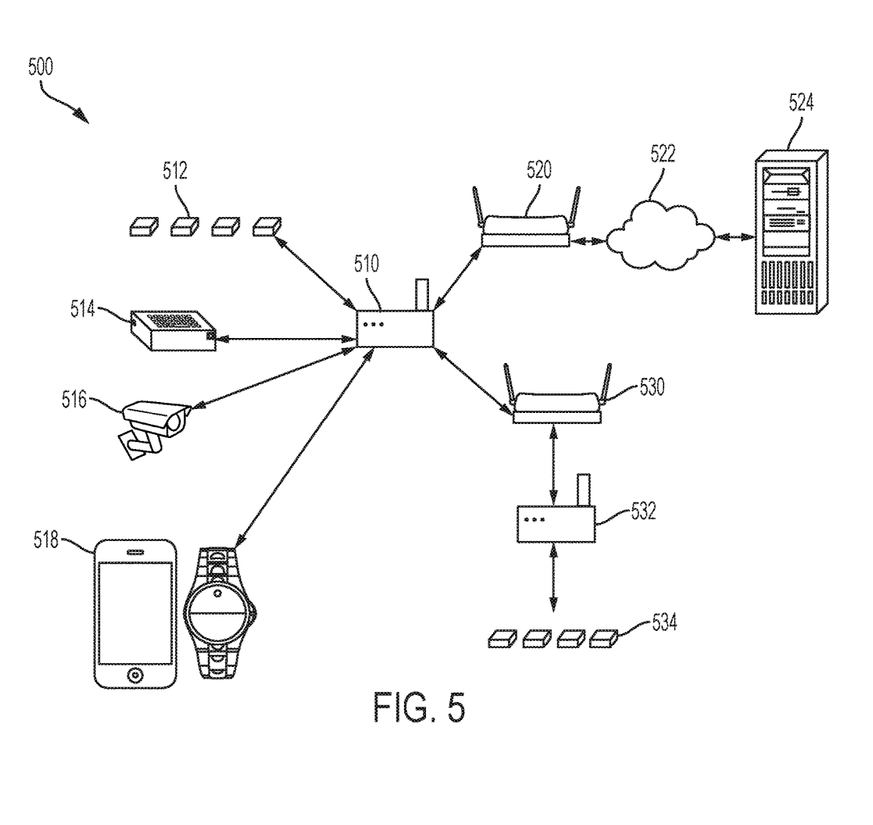
FIG. 5 is a block diagram illustrating communications paths around a vehicle gateway for communicating with electronic components according to one embodiment of the disclosure.

As described in the examples above, many combinations of electronic devices such as shown in FIG. 1, FIG. 2, FIG. 3, and FIG. 4 may be configured to operate with a vehicle gateway. An illustration of communications between the electronic devices is described in FIG. 5 without reference to any particular application. FIG. 5 is a block diagram illustrating communications paths around a vehicle gateway for communicating with electronic components according to one embodiment of the disclosure. A gateway 510 may be coupled to and/or include various input devices to accommodate communication with a variety of devices in different configurations. The gateway 510 may be programmed, such as through firmware or software, to perform a number of different functions involving the various electronic devices. Although certain trucking examples are described in FIG. 1, FIG. 2, FIG. 3, FIG. 4, and the examples below, the gateway 510 may be configured to perform many other functions. For example, rather than using the gateway 510 on a truck for cargo management, the gateway 510 may be installed in a passenger vehicle and used to assist a driver on a cross-country trip. Further, the gateway 510 need not be limited to land vehicles, but may also be used in other configurations, such as on boats and aircraft for tracking cargo.

The gateway 510 may be coupled to and/or include input devices for communicating with local electronic devices that are in or near the vehicle. For example, the gateway 510 may be configured with wireless or wired communication input devices to receive data from vehicle sensors 512, an engine computer 514, cameras 516, and/or mobile devices 518. The input devices configured to communicate with the devices 512, 514, 516, and/or 518 may include wired communications interfaces, such as Ethernet, OBDII, serial, or parallel interfaces, and/or wireless communications interfaces, such as Wi-Fi, Bluetooth, ZigBee, RFID, or NFC.

The gateway 510 may also be coupled to input devices, such as modem devices, for communicating with electronic devices away from the vehicle. For example, the gateway 510 may be coupled to a long-range communications modem 520 for communicating over a network 522, such as the Internet, with remote servers 524. The remote servers 524 may offer storage and/or processing capabilities that enhance the function of the gateway 510. As another example, the gateway 510 may be coupled to and/or include a short-range communications modem 530 for communicating with a second gateway 532. The second gateway 532 may be attached to a second vehicle and be configured to communicate with electronic devices 534 in or near the second vehicle. The gateway 510 may have access to raw data from the electronic devices 534 and/or receive processed data from the second gateway 532.

The vehicle gateway may be used to modify operation of components of the vehicle. For example, the vehicle gateway, through a connection to an engine computer, may re-configure the engine, such as by flashing a new firmware in the engine computer. In some embodiments, the new firmware may be selected to improve operation of the vehicle, such as to achieve improved fuel efficiency. Fuel efficiency is an important component of overall profit margins in the commercial trucking industry. Higher fuel efficiency may be obtained by adjusting a vehicle's engine firmware as appropriate for environmental conditions, such as elevation, terrain, temperature, humidity, and/or air density on the vehicle's route. The vehicle gateway may perform the engine firmware adjustment. Further, the vehicle gateway may determine timing and/or location for the engine firmware update to take into account the needs of the driver, anticipated traffic, and/or real-time re-routing due to undesirable conditions. The vehicle gateway may use information, such as map and route planning, to decide when to do a firmware update during an already-planned stop or adjust the timing of a planned stop to perform the firmware update during the stop. Using a vehicle gateway to perform the firmware updating may improve the fuel efficiency of the vehicles. Further, by providing an ability to perform firmware updating while the vehicle is on the road, the vehicles may be operated across more divers environments. For example, conventionally some vehicles are restricted to operations at certain altitudes for which the vehicle is programmed for optimized performance in those altitude. Vehicle gateway-based firmware updates vehicles may be used, in some embodiments, to operate at different elevations.

Figure 6:
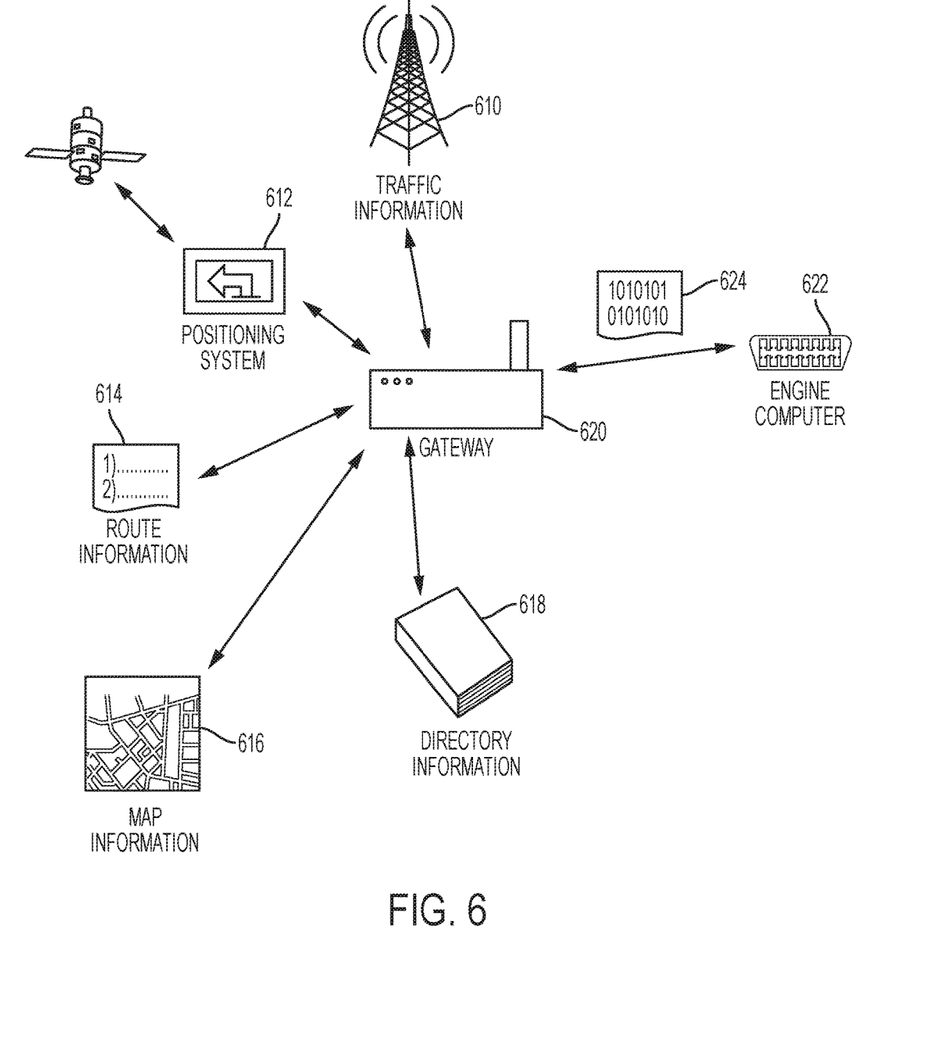
FIG. 6 is a block diagram illustrating different input data for selecting a firmware for the engine computer according to one embodiment of the disclosure.

More generically, by aggregating multiple data sources, both locally in the vehicle and in the cloud, firmware updates may be applied at predetermined, and possibly preferred, times and locations to maximize vehicle efficiency and meet the needs of the driver. Some of the data sources are illustrated in FIG. 6. FIG. 6 is a block diagram illustrating different input data for selecting a firmware for the engine computer according to one embodiment of the disclosure. A vehicle gateway 620 may receive information from sources 610-618. For example, traffic information 610 may be received by the vehicle gateway 620 from internet sources or FM broadcast sources. Positioning information 612 may be received by the vehicle gateway 620 from a positioning system such as GPS, GLONASS, or cellular triangulation. Route information 614 may be received by the vehicle gateway 620 from a remote server through the Internet or the route entered in to the GPS, received from scanned codes on freight pieces loaded onto the vehicle, and/or received from user input to the vehicle gateway 620. Map information 616 may be received by the vehicle gateway 620 from a remote server through the Internet, the map database of the GPS, a local database, a local secure digital (SD) card, or other source. Directory information 618 may be received by the vehicle gateway 620 from a local database, received from a remote server through the Internet, or other source. The directory information 618 may include, for example, hotels, gas stops, rest stops, or the like, and their location information for route planning and determination of a time to update engine firmware. The vehicle gateway 620 may consider one or more of these data sources, or other data sources, and determine a time for firmware updating, determine a specific adjustment for the engine firmware, and/or determine a new engine firmware for the vehicle. Each of these data sources may be provided to the vehicle gateway 620 through an input device coupled to the vehicle gateway.

In one embodiment, the vehicle gateway may monitor the location of the vehicle and determine a firmware update for the vehicle based on the vehicle's location. For example, the engine firmware may be updated to select a firmware appropriate to the vehicle's location and altitude at that location. The vehicle gateway may have a storage device containing a database of vehicle firmware from which to program the engine computer. The vehicle gateway may also receive vehicle firmware through the Internet, such as through a cellular connection or Wi-Fi connection.

Figure 7:
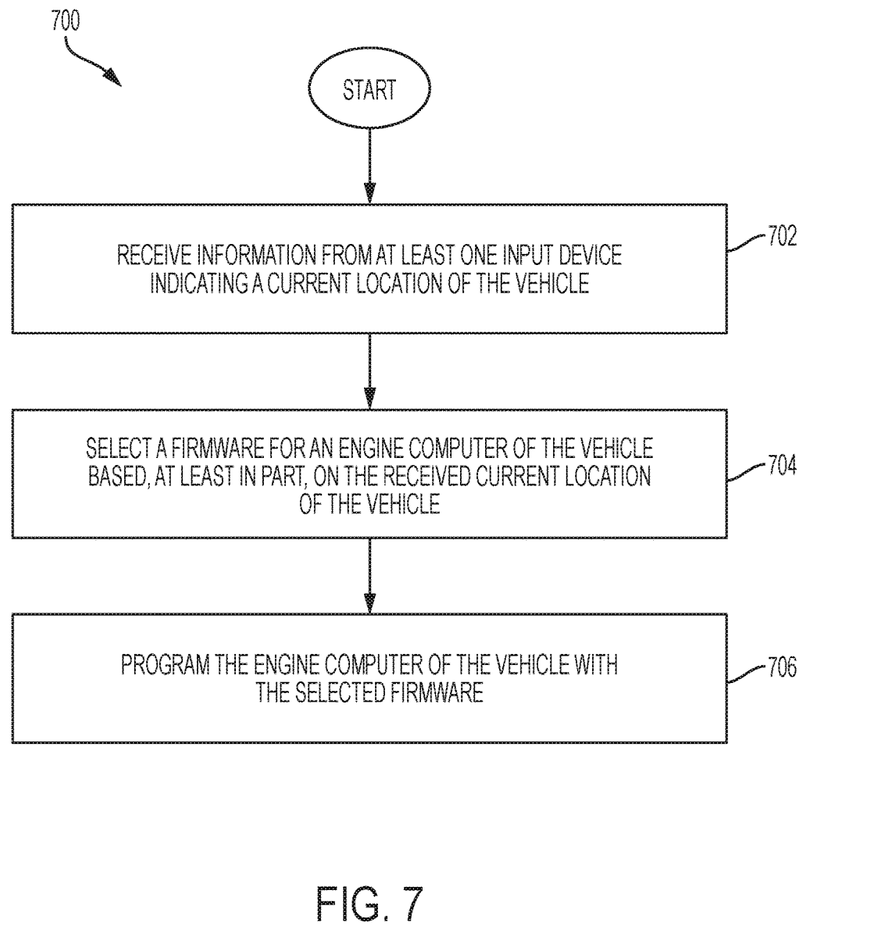
FIG. 7 is a flow chart illustrating a method of reprogramming a firmware of an engine according to one embodiment of the disclosure.
Figure 8:
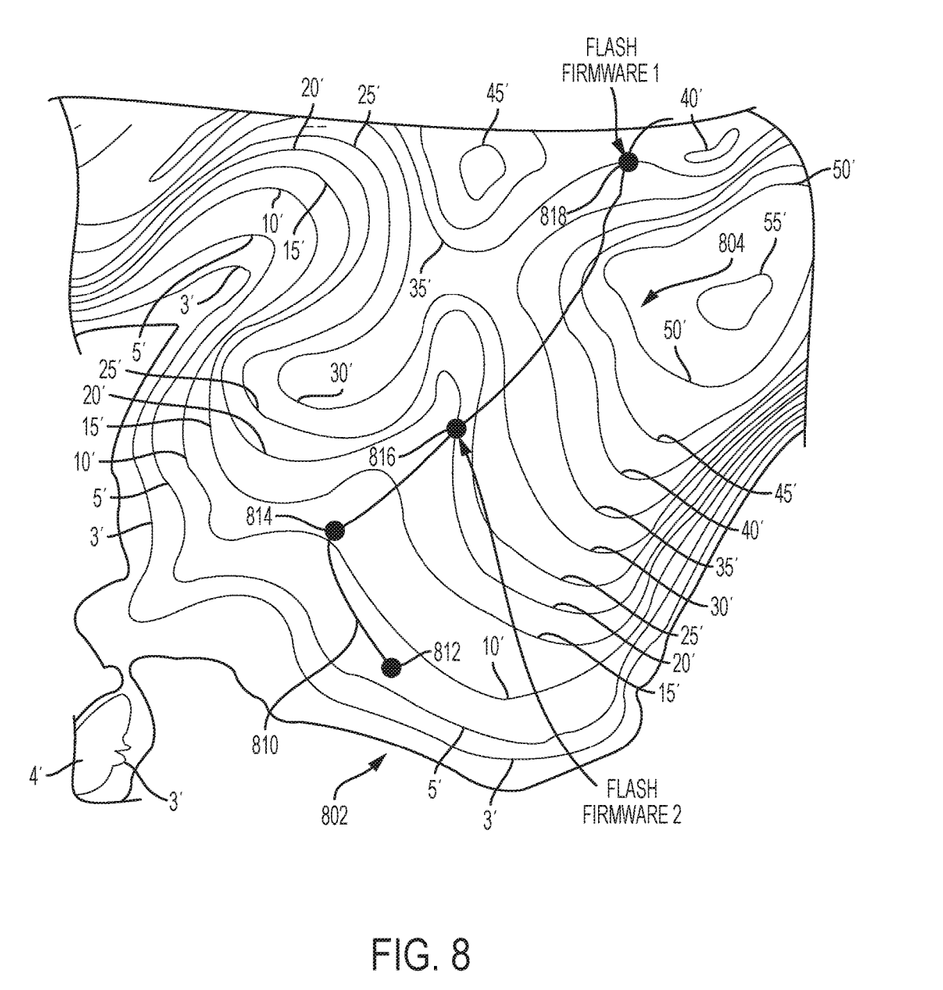
FIG. 8 is an illustration of a vehicle route with engine computer reprogramming points along the route according to one embodiment of the disclosure.

As described above, engine fuel efficiency may be improved by adapting the engine firmware for an operating altitude. One method for operating a vehicle gateway for updating engine firmware is described with reference to FIG. 7. FIG. 7 is a flow chart illustrating a method of reprogramming a firmware of an engine according to one embodiment of the disclosure. A method 700 may begin at block 702 with receiving information from at least one input device indicating a current location of the vehicle. At block 704, a firmware may be selected for an engine computer of the vehicle based, at least in part, on the received current location of the vehicle. The received current location may be, for example, a relative location along the vehicle's route. The firmware may be selected based on the vehicles location, either known or predicted, along the route based on information that an upcoming portion of the route would benefit from the selected firmware. At block 706, the engine computer may be programmed with the selected firmware. In some embodiments, the determined location may also be a completion amount of the vehicle's route, such as to predict in advance when a different engine firmware would provide better operation of the vehicle. Thus, a vehicle firmware may be selected and programmed into the engine computer in advance of One example of a vehicle gateway updating engine firmware based on location is shown in FIG. 8. FIG. 8 is an illustration of a vehicle route with engine computer reprogramming points along the route according to one embodiment of the disclosure. A map in FIG. 8 may illustrate a route 810 for a vehicle. The router 810 may include planned stops 812, 814, 816, and 818. The map may include a low elevation region 802 and a high elevation region 804. As the vehicle is approaching the high elevation region 804, the vehicle gateway may execute an engine firmware update at a planned stop prior to the high elevation region 804. For example, the vehicle gateway may determine to update an engine by flashing a second firmware at stop 816. The vehicle gateway may determine to return the engine to the original firmware at block 818.

Figure 9:
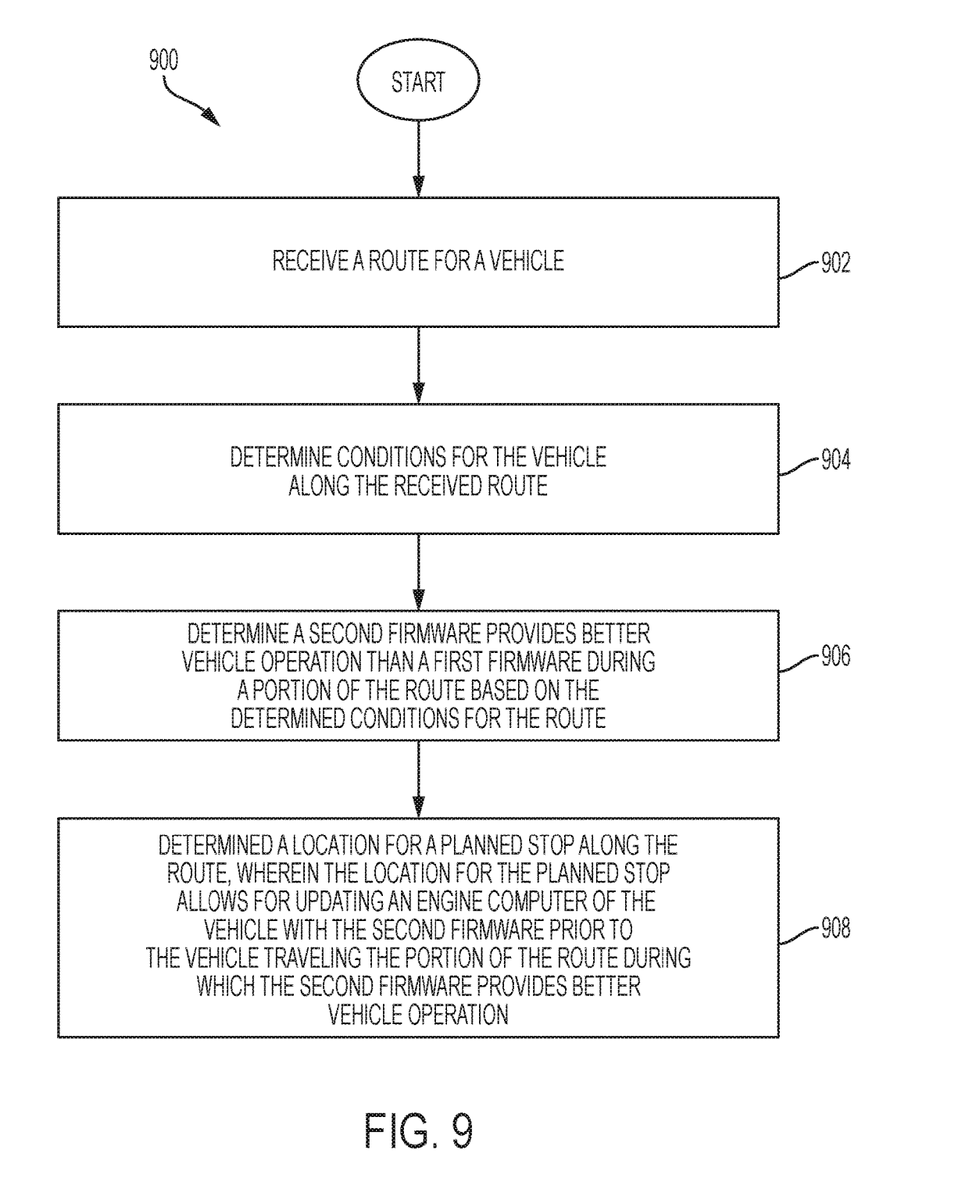
FIG. 9 is a flow chart illustrating a method of planning a route for a vehicle to include engine computer firmware reconfigurations according to one embodiment of the disclosure.

FIG. 9 is a flow chart illustrating a method of planning a route for a vehicle to include engine computer firmware reconfigurations according to one embodiment of the disclosure. A method 900 may begin at block 902 with receiving, by the vehicle gateway, a route for a vehicle. At block 904, the vehicle gateway may determine conditions for the vehicle along the received route. The determined conditions may include, for example, the altitude of roads along the route, such as described in examples above. The determined conditions may also or alternatively include weather, road type, traffic, etc. At block 906, the vehicle gateway selects a second firmware for the engine that provides better vehicle operation (than an existing first firmware on the engine) during at least a portion of a route of the vehicle based on determined conditions for the route. At block 908, the vehicle gateway determines a location for a planned stop along the route at which to update the engine computer with the second firmware selected at block 906. The determined location may be displayed to the user, such as through a dashboard display or the user's mobile device, to inform the user to stop the vehicle at the determined location. The determined location may be at a location prior to traversing a majority of the portion of the route that benefits from the improved efficiency of the second firmware.

In some embodiments, the determined location may be off planned stops for the vehicle or off a planned route for the vehicle. The vehicle gateway may adjust the route for the vehicle to include at least one of a driver rest stop, a re-fueling stop, a service stop, and a traffic stop based, at least in part, on the received conditions at block 904 that were used to determine the location at block 908. For example, if there are no stops before entering an area of high elevation, the vehicle gateway may add a planned stop for the driver to allow for the firmware update. If the vehicle gateway determines a firmware update is necessary immediately due to changed conditions, the gateway may signal the driver to stop the vehicle for the update.

Although firmware updates during stops are described in certain embodiments above, the vehicle may be capable of updating the firmware, or portions of the firmware, without stopping the vehicle. For example, certain programs or parameters within the engine computer may be updated during operation of the vehicle. As another example, some vehicle engines may have complete firmware updates performed during vehicle option, and the planned stops may be unnecessary. However, if the vehicle does require the engine to be turned off for the firmware update, then the firmware update may proceed at the stops described above.

The schematic flow chart diagrams of FIG. 7 and FIG. 9 are generally set forth as a logical flow chart diagram. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The operations described above as performed by a gateway, beacon, or electronic device may be performed by any circuit configured to perform the described operations. Such a circuit may be an integrated circuit (IC) constructed on a semiconductor substrate and include logic circuitry, such as transistors configured as logic gates, and memory circuitry, such as transistors and capacitors configured as dynamic random access memory (DRAM), electronically programmable read-only memory (EPROM), or other memory devices. The logic circuitry may be configured through hard-wire connections or through programming by instructions contained in firmware. Further, the logic circuitry may be configured as a general purpose processor capable of executing instructions contained in software. If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. For example, although processors are described as components in gateways, beacons, mobile devices, or electronic devices, aspects of the invention may be implemented on different kinds of processors, such as graphics processing units (GPUs), central processing units (CPUs), and digital signal processors (DSPs). As another example, although processing of certain kinds of data may be described in example embodiments, other kinds or types of data may be processed through the methods and devices described above. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. An information handling system, comprising:
  at least one input device configured to provide information regarding a vehicle;
  a gateway configured to communicate with the at least one input device and to communicate with an engine computer of the vehicle through the at least one input device, wherein the gateway is configured to perform steps comprising:
    receiving information from the at least one input device indicating a location of the vehicle;
    selecting a firmware for the engine computer based, at least in part, on the location of the vehicle; and
    programming the engine computer with the selected firmware.

2. The information handling system of claim 1, wherein the at least one input device comprises a positioning system sensor, and wherein the gateway is configured to receive positioning information from the positioning system sensor indicating the location of the vehicle.

3. The information handling system of claim 1, wherein the gateway is further configured to receive information regarding a route for the vehicle, and wherein the gateway is configured to select the firmware for the vehicle based, at least in part, on the route for the vehicle.

4. The information handling system of claim 3, wherein the at least one input device further comprises a network device configured to receive road conditions for the route from a remote location, and wherein the gateway is configured to plan a time on the route for performing the step of programming the engine computer with the firmware.

5. The information handling system of claim 4, wherein the received road conditions comprise an altitude.

6. The information handling system of claim 4, wherein the gateway is further configured to adjust the route for the vehicle to include stops during which the gateway performs the step of programming the engine computer with the firmware.

7. The information handling system of claim 4, wherein the gateway is further configured to adjust the route for the vehicle to include at least one of a driver rest stop, a re-fueling stop, a service stop, and a traffic stop based, at least in part, on the received road conditions.

8. The information handling system of claim 1, wherein the firmware programmed in the engine computer of the vehicle is selected to improve fuel efficiency of the vehicle under environmental conditions expected near the location of the vehicle.

9. The information handling system of claim 1, wherein the at least one input device is integrated with the gateway.

10. A method, comprising:
receiving, by a vehicle gateway, information from the at least one input device indicating a location of the vehicle;
selecting, by the vehicle gateway, a firmware for the engine computer based, at least in part, on the location of the vehicle; and
programming, by the vehicle gateway, the engine computer with the selected firmware.

11. The method of claim 10, further comprising receiving information regarding a route for the vehicle, wherein the step of programming comprises programming the engine computer with a firmware selected for the vehicle based, at least in part, on the route for the vehicle.

12. The method of claim 11, further comprising receiving, by the vehicle gateway, road conditions for the route from a remote location.

13. The method of claim 11, further comprising adjusting, by the vehicle gateway, the route for the vehicle to include stops during which the vehicle gateway performs the step of programming the engine computer with the firmware.

14. The method of claim 10, wherein the firmware programmed in the engine computer of the vehicle is selected to improve fuel efficiency of the vehicle under environmental conditions expected near the location of the vehicle.

15. An information handling system, comprising:
at least one input device configured to provide information regarding a vehicle;
a gateway configured to communicate with the at least one input device and to communicate with an engine computer of the vehicle through the at least one input device, wherein the gateway is configured to perform steps comprising:
receiving a route for a vehicle;
determining conditions for the received route;
determining a second firmware provides better vehicle operation than a first firmware during a portion of the received route based on the determined conditions;
determining a location for a planned stop along the route, wherein the location for the planned stop is selected at a location before at least a fraction of the portion of the received route; and
updating the engine computer with the second firmware at the determined location.

16. The information handling system of claim 15, wherein the step of determining the location for the planned stop comprises adjusting the route for the vehicle to include a stop during which the vehicle gateway performs the step of programming the engine computer with the firmware.

17. The information handling system of claim 15, wherein the step of determining conditions comprises determining road altitude along a portion of the route, and wherein the step of determining the second firmware comprises determining the second firmware of the vehicle provides improved fuel efficiency for the determined altitude along the portion of the route.

18. The information handling system of claim 15, wherein the step of determining conditions comprises determining road altitude along a portion of the route, and wherein the step of determining road altitude comprises receiving map information from a remote server.

19. The information handling system of claim 15, wherein the vehicle gateway is further configured to display, by the vehicle gateway, the determined location for the planned stop on a mobile device of a user operating the vehicle.

20. The information handling system of claim 15, wherein the gateway is configured to receive the second firmware from a remote server.

* * * * *